Figure 1:
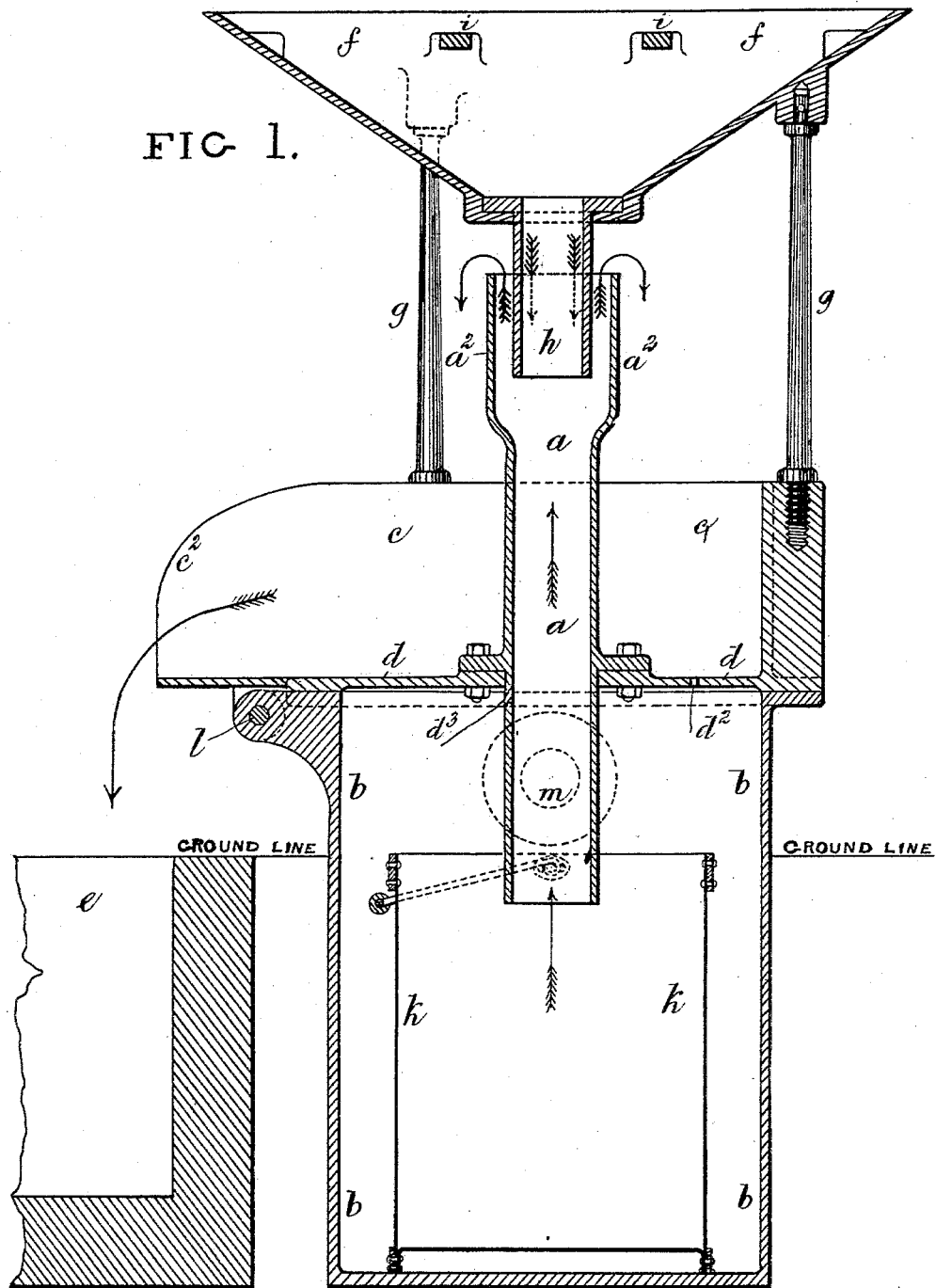

(No Model.) 2 Sheets—Sheet 1.

T. B. SHARP.
MACHINERY FOR CONCENTRATING ORES, &c.

No. 303,889. Patented Aug. 19, 1884.

Witnesses. Inventor.

(No Model.) 2 Sheets—Sheet 2.

T. B. SHARP.
MACHINERY FOR CONCENTRATING ORES, &c.

No. 303,889. Patented Aug. 19, 1884.

Witnesses.
George Shaw
Richard Skerrett

Inventor.
Thomas Buckworth Sharp.

UNITED STATES PATENT OFFICE.

THOMAS BUDWORTH SHARP, OF FRENCH WALLS, SMETHWICK, COUNTY OF STAFFORD, ENGLAND.

MACHINERY FOR CONCENTRATING ORES, &c.

SPECIFICATION forming part of Letters Patent No. 303,889, dated August 19, 1884.

Application filed May 26, 1884. (No model.) Patented in England January 16, 1883, No. 265.

*To all whom it may concern:*

Be it known that I, THOMAS BUDWORTH SHARP, a subject of the Queen or Great Britain, residing at French Walls, Smethwick, in the county of Stafford, England, have invented certain new and useful Improvements in Machinery for Concentrating Ores, &c., (for which I have received Letters Patent in Great Britain No. 265, dated January 16, 1883,) of which the following is a specification.

My invention consists of the improved combinations or arrangements of parts, hereinafter described and claimed, of machinery or apparatus for separating solids of different specific gravities—that is, for dressing ores or separating the metallic from the earthy matters of the said ores, for separating metallic particles or filings from non-metallic particles, and for other like purposes.

In constructing machinery or apparatus according to my invention, I employ a vertical or nearly vertical pipe or tube, (which I will hereinafter call the "water-tube,") open at top and bottom, the top being expanded or funnel-shaped. This water-tube is supported, preferably, in the center of a tank having near its top a horizontal diaphragm through which the water-tube passes, and in which it fits tightly, there being no communication between the upper and lower compartments of the said tank, excepting through the water-tube. The lower open end of the water-tube is at a considerable height from the bottom of the tank, the said open bottom of the water-tube having underneath it a vessel or receptacle to receive anything which passes out at the open bottom of the tube. Over the top funnel-shaped mouth of the water-tube is a stage or platform, and in the said platform is a hole opening into a guide-tube, the lower end of which guide-tube enters the funnel-shaped mouth of the water-tube. An entrance or inlet water-passage, which will be controlled by a stop-cock or valve, opens into the lower compartment of the tank, and an overflow-pipe opens into the upper compartment of the tank.

In using the machinery or apparatus water is introduced by the inlet-passage into the lower compartment of the tank, by which water the said lower compartment of the tank and the receptacle contained in it are filled with water and a stream of water directed upward through the water-tube. The said stream overflows the top funnel-shaped mouth of the water-tube, and falling into the upper compartment of the tank passes away by the overflow-pipe. The mixture of solid particles to be separated is put upon the platform and pushed into the guide-tube, from which it falls into the water-tube, meeting in its descent the ascending stream of water. By regulating the velocity of the said ascending stream of water, by means of the stop-cock or valve referred to, the velocity of the said ascending stream may be made to exceed the velocity with which the particles of the lighter solid fall in still water. By this regulation of the ascending stream the lighter particles do not descend in the water-tube, but are carried with the overflow water, falling over the edge of the funnel-shaped top of the water-tube, while the heavier particles descend in the water-tube with a velocity equal to the difference between their rate of descent in still water and the velocity of the ascending stream. The heavy particles thus falling down the water-tube are collected in the receptacle in the lower compartment of the tank, the lighter particles, as hereinbefore explained, being carried away by the overflow-water, from which they may be recovered by subsidence, if they are valuable.

I will now proceed to describe the construction and combination of parts constituting my invention, reference being had to the accompanying drawings, in which—

Figure 2:
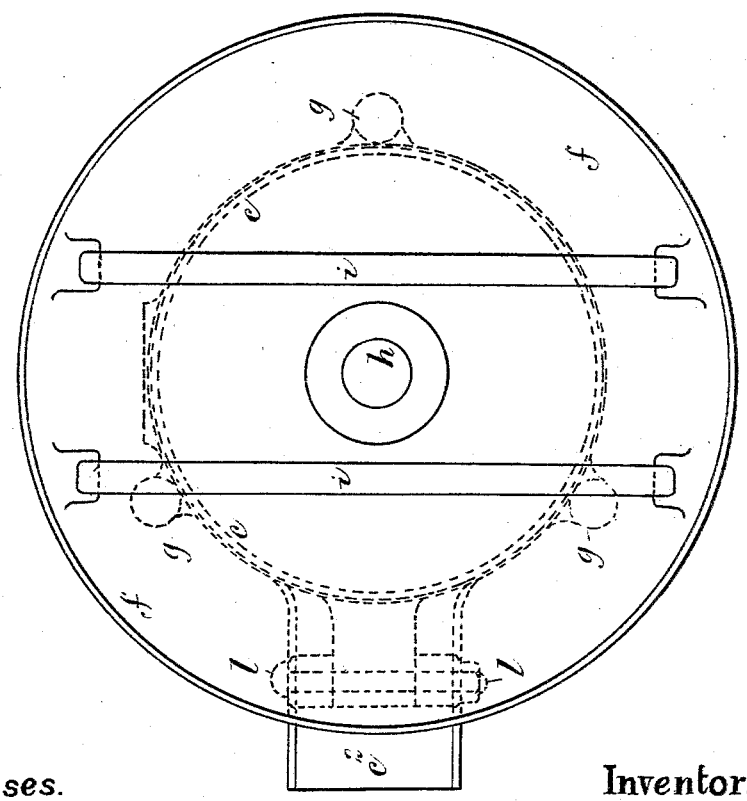

Figure 1 represents in vertical section, and Fig. 2 in plan, machinery or apparatus constructed according to my invention for separating solids of different specific gravities.

The same letters of reference indicate the same parts in both figures.

*a* is the vertical water-tube of the apparatus, open at top and bottom, the said water-tube being fixed in the center of the divided tank *b c*. The horizontal division or diaphragm dividing the tank into two parts is marked *d*. The water-tube *a* passes through the said horizontal diaphragm *d*, as represented in Fig. 1, and is fixed thereto by the flange and screw-bolts and nuts shown. The water-tube $a$ is fixed water-tight in the diaphragm $d$, so that there is no communication between the upper and lower compartments, $b$ $c$, of the tank, excepting through the said water-tube $a$. The upper end of the water-tube $a$ is expanded at $a^2$, and constitutes the overflow end, the overflow-water from which falls into the upper compartment, $c$, of the tank, from whence it passes by the spout $c^2$ into the pit $e$, (or other receptacle,) which is furnished with an overflow-pipe. $f$ is a funnel supported over the top of the water-tube $a$ by the rods or columns $g$ $g$, which are fixed to the upper compartment $c$, of the tank. The funnel $f$ carries a guide-tube, $h$, the lower end of which dips into the expanded mouth $a^2$ of the water-tube $a$. Crossing the funnel $f$ is a support, stage, or platform, $i$ $i$, upon which a riddle may rest, into which the mixture to be separated is shoveled or placed. In the lower compartment, $b$, of the tank is a vessel or receptacle, $k$, situated underneath the lower open end of the water-tube $a$, for receiving the heavier particles of the mixture to be separated. In order to introduce the vessel $k$ into and remove it from the lower compartment, $b$, of the tank, the upper compartment, $c$, carrying the water-tube $a$ $a^2$ and funnel $f$, and other parts, is jointed to the lower compartment, $b$, by a hinge-joint at $l$. This joint $l$ permits the upper compartment, $c$, to be thrown back or turned aside, so as to uncover the lower compartment, $b$, when required to remove and replace the vessel $k$. The part $c$ of the tank is fixed down upon the part $b$ during the working of the apparatus by clamps or otherwise; but ordinarily the weight of the upper part, $c$, and the parts carried by it, is sufficient to maintain the part $c$ in position and preserve the junction between it and the part $b$ water-tight. $m$ is the entrance or inlet water passage into the bottom compartment, $b$. This inlet-water passage will be controlled by a stop-cock or valve, (not shown,) so as to regulate the velocity of the stream of water passing through the apparatus, according to the requirements of the mixtures being operated upon. The stream of water entering through the passage $m$ is supplied from a reservoir at a greater height than the funnel $f$, or is supplied under such pressure as will cause it to rise with the required velocity in the tube $a$.

The action of the machinery or apparatus is as follows: Water being introduced by the inlet-passage $m$, and its rate of entrance regulated by the stop-cock or valve described, the lower compartment, $b$, of the tank and the vessel or receptacle $k$ are filled with water, and a stream of water rising upward through the water-tube $a$ overflows the expanded mouth $a^2$ of the said water-tube and falls into the upper compartment, $c$, of the tank and passes into the pit or other receptacle, $e$. The mixture of solid particles to be separated being placed in the riddle, supported on the platform $i$, a to-and-fro motion is given to the said riddle, and the materials to be operated upon fall in a nearly-uniform stream through the guide-tube $h$, as indicated by the dotted arrows, into the water-tube $a$, and meet in their descent the ascending stream of water in the said water-tube. The velocity of the ascending stream of water having been regulated, as hereinbefore described, the lighter particles of the mixture do not descend the water-tube $a$, but are carried with the overflow water, falling over the edge of the expanded top $a^2$ of the water-tube, while the heavier particles descend in the water-tube $a$ and are collected in the receptacle $k$ in the lower compartment, $b$, of the tank. The lighter particles which are carried with the overflow-water fall into the upper compartment, $c$, and are conducted by the spout $c^2$ into the pit $e$, for recovery, if valuable.

Instead of placing the mixture to be separated in a riddle, as described, the mixture may be introduced directly into the funnel $f$ in a gentle stream in any convenient manner.

In order to permit the escape of air from the top of the lower compartment, $b$, a small hole may be made either in the diaphragm or division $d$, as indicated at $d^2$, or in the water-tube $a$, as indicated at $d^3$.

Figure 3:
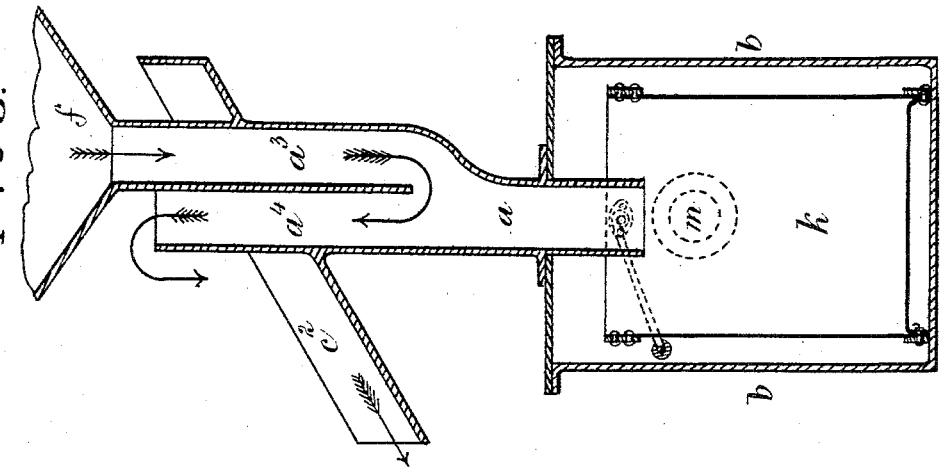

The water-tube $a$ and tank may be modified in the manner illustrated in vertical section in Fig. 3. In this modification the upper portion of the water-tube $a$ is divided by a vertical partition into two parts or legs, (marked, respectively, $a^3$ and $a^4$,) the leg $a^3$, opening into the funnel $f$, and the other leg, $a^4$, forming the overflow part of the water-tube. The overflow-water and lighter particles are received from the pipe $a^4$ by the trough $c^2$, from which they fall into a pit or receptacle. The action of this modification is exactly the same as that of the arrangement already described.

By the use of my invention skilled labor is dispensed with in the separating of solids of different specific gravities, and the separation is efficiently, economically, and rapidly effected with a minimum expenditure of water.

My invention is applicable, among other purposes, to the washing or dressing of ground ores, the washing of precipitated metals, the washing of jewelers' sweepings, and casters' and smelters' sweepings, and sweepings obtained in other metallurgical operations, and generally to the separation of all such solid particles of different specific gravities as are not soluble in or injuriously affected by water.

Having now described the nature of my invention and the manner in which the same is to be performed, I wish it to be understood that I claim as my invention—

1. The combination of the closed tank provided with an inlet for water, a receiving-receptacle within said tank, a delivery-tube extended through the top of the tank into the receiving-receptacle, a hopper from which material is fed into said delivery-tube, and a trough for receiving overflow material from the upper end of the delivery-tube, substantially as described.

2. The combination of the tank divided into an upper and a lower compartment provided, respectively, with an inlet and exit for water, a receiving-receptacle within the lower compartment, a delivery-tube open at both ends and extended from the upper into the lower compartment, and a hopper supported above the upper compartment and provided with a guide-tube of smaller diameter than the delivery-tube, and fitted within the latter, substantially as described.

3. The combination of the tank divided into an upper and lower compartment, with the former hinged to the latter, and provided, respectively, with inlet and exit passages for water, a delivery-tube supported by the upper compartment and extended into the lower compartment, and a hopper supported above the upper compartment and provided with a guide-tube of smaller diameter than the delivery-tube, and fitting into the latter, substantially as described.

THOMAS BUDWORTH SHARP. [L. S.]

Witnesses:
GEORGE SHAW,
RICHARD SKERRETT.